United States Patent [19]
Blum

[11] 3,771,405
[45] Nov. 13, 1973

[54] MICROTOME
[75] Inventor: Josef Blum, Norwalk, Conn.
[73] Assignee: Ivan Sorvall, Inc., Newtown, Conn.
[22] Filed: Sept. 8, 1972
[21] Appl. No.: 287,583

[52] U.S. Cl............... 83/714, 83/412, 83/522, 83/915.5
[51] Int. Cl. ............................................ G01n 1/06
[58] Field of Search.................. 83/714, 412, 522, 83/915.5

[56] References Cited
UNITED STATES PATENTS
2,822,726  2/1958  Blum.......................... 83/915.5 UX
3,673,904  7/1972  Cooper et al.................. 83/915.5 X Primary Examiner—Frank T. Yost
Attorney—I. Jordan Kunik

[57] ABSTRACT

An improved microtome, including novel mechanisms for incrementally advancing the specimen supporting canti-lever arm toward the stationary cutting knife for producing successive specimen sections during the cutting stroke of said arm, and novel means for retracting the cantilever arm during the return stroke thereof to cause the specimen to bypass the cutting knife prior to the next cutting cycle. The cantilever arm is articulated upon a fulcrum which is movable on a compound multiple pivoting system, the component parts of which are selectively separately and jointly operable to cause said arm to advance and retract alternately during each cutting cycle thereof, and to produce a net predetermined incremental advance of the specimen for each of said cycles.

42 Claims, 18 Drawing Figures

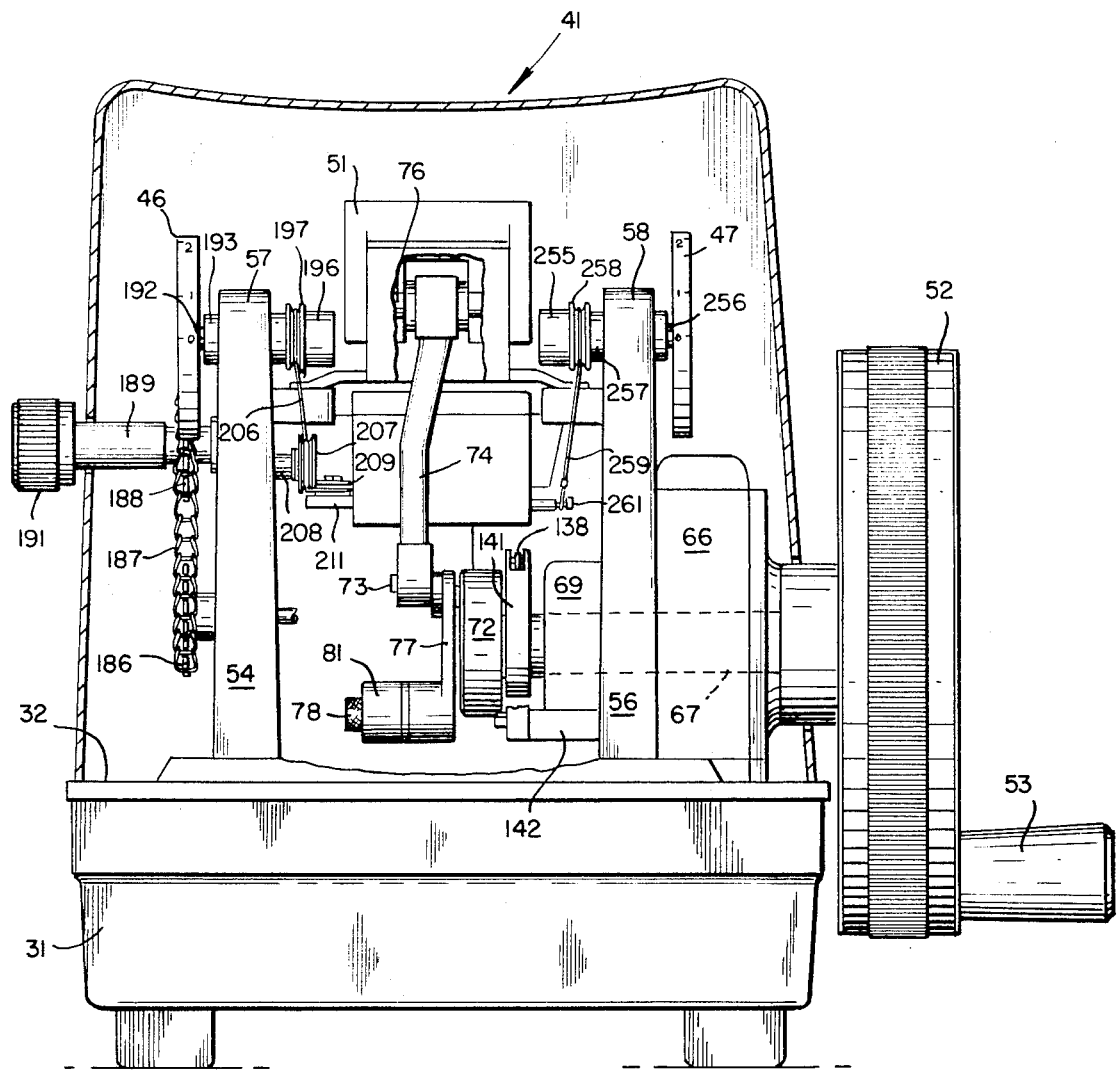
FIG. 2
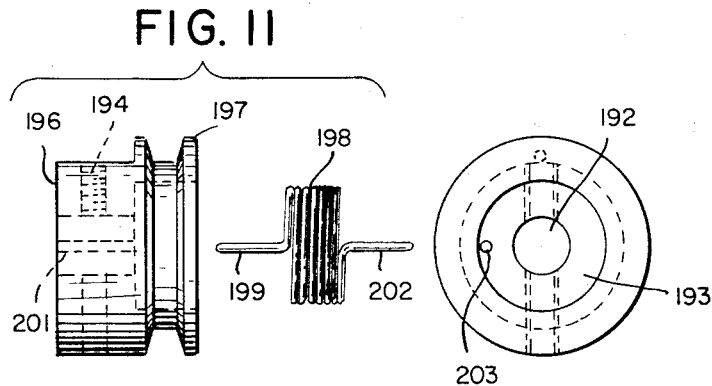
FIG. 11
FIG. 12

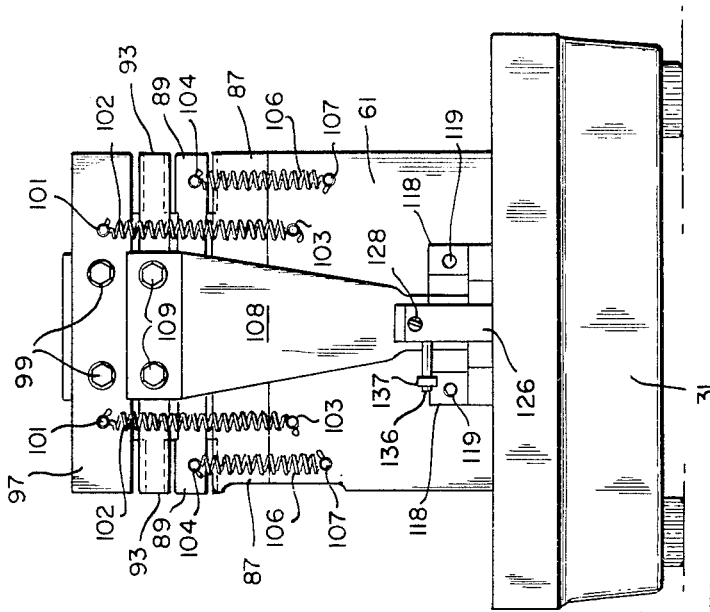
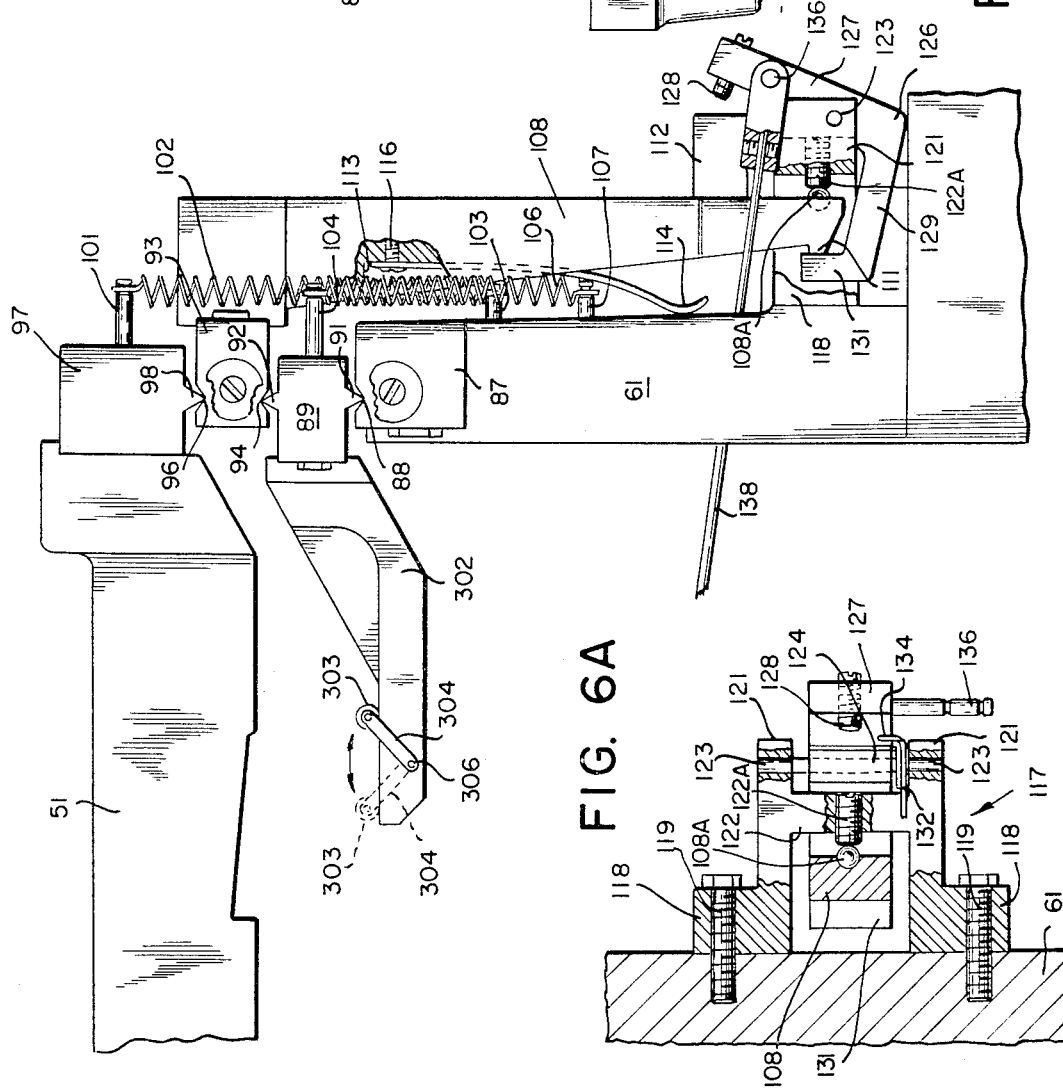
FIG. 7
FIG. 6
FIG. 6A

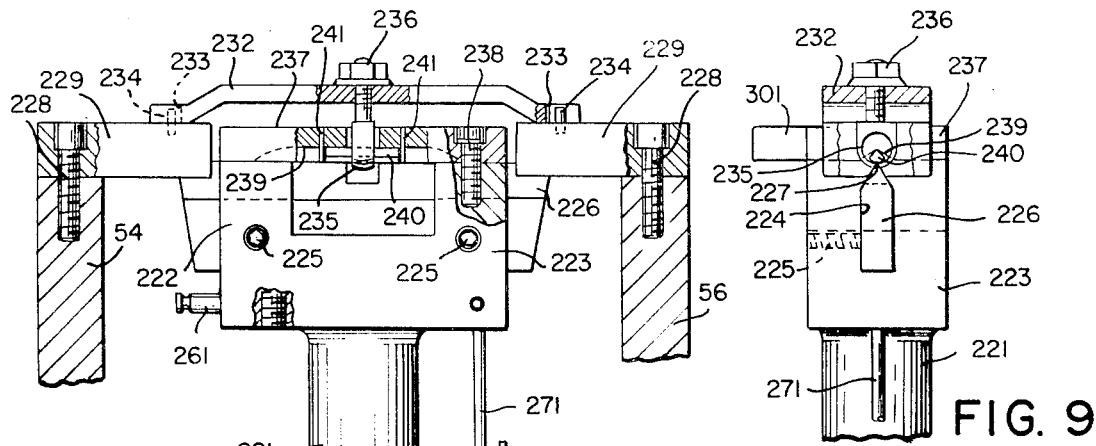
FIG. 8
FIG. 9
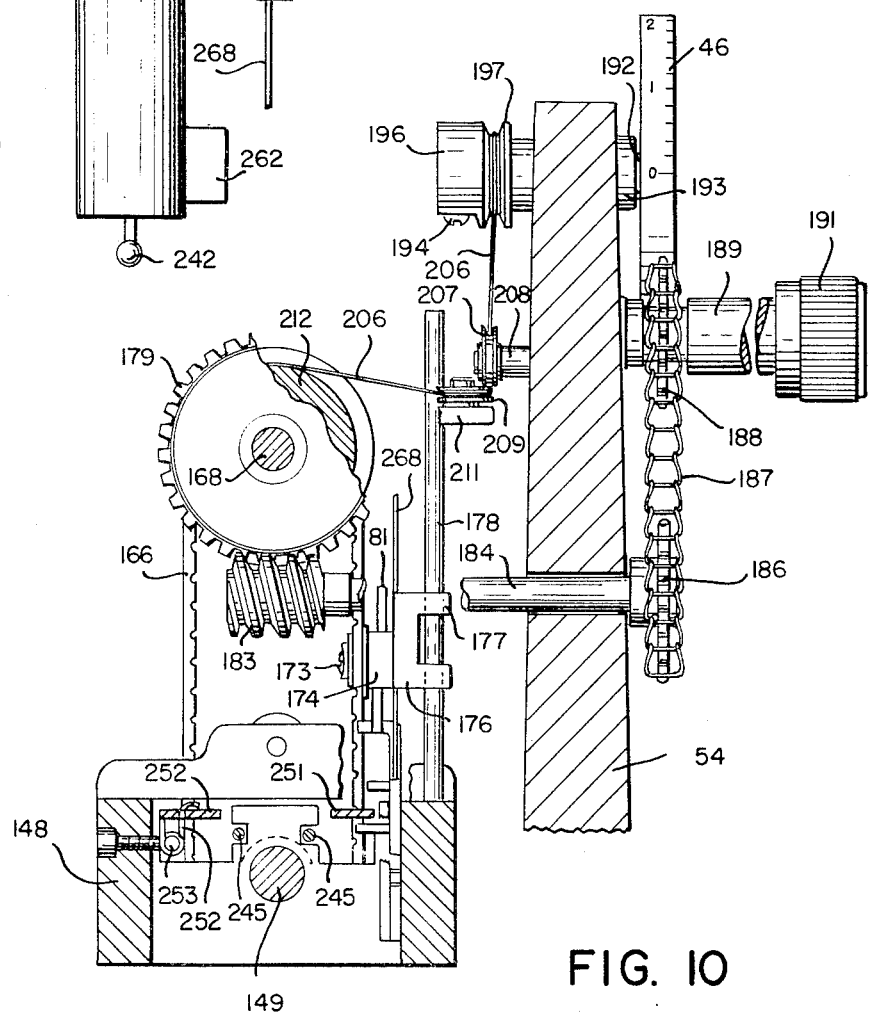
FIG. 10

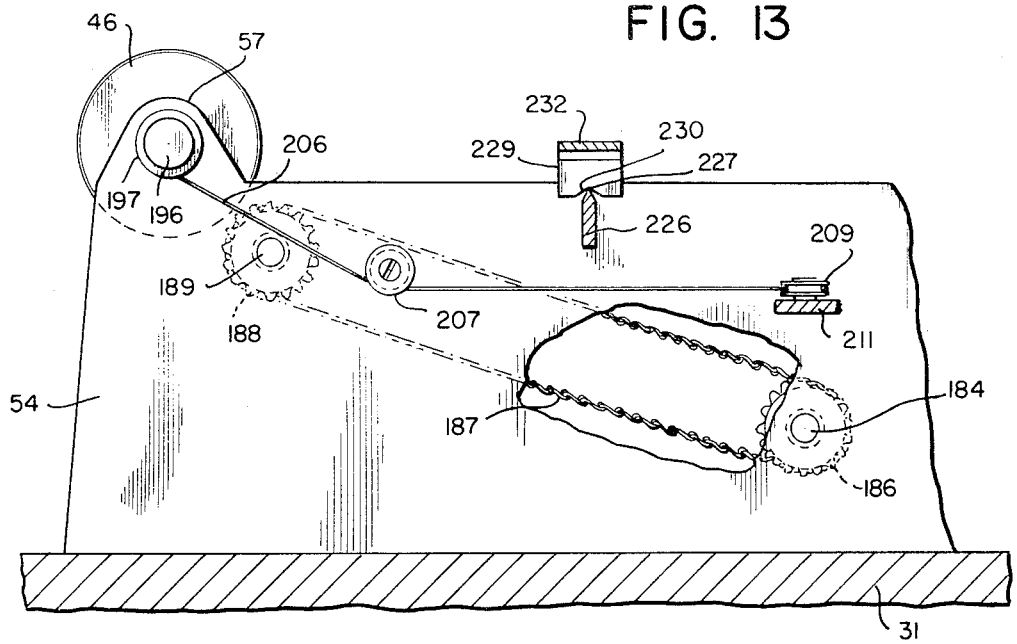
FIG. 13
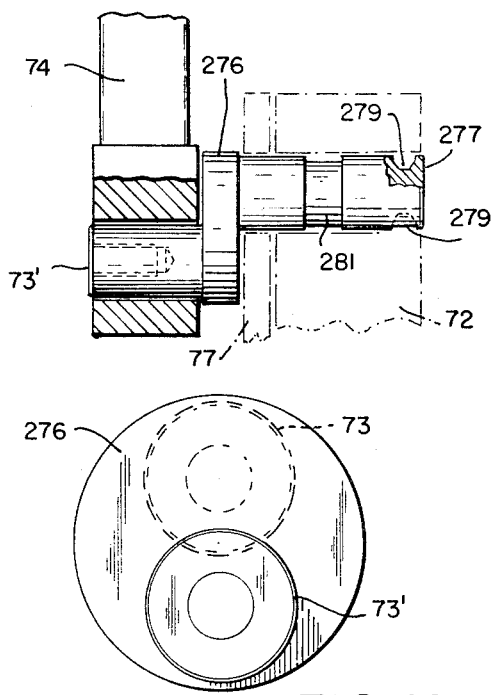
FIG. 15
FIG. 16
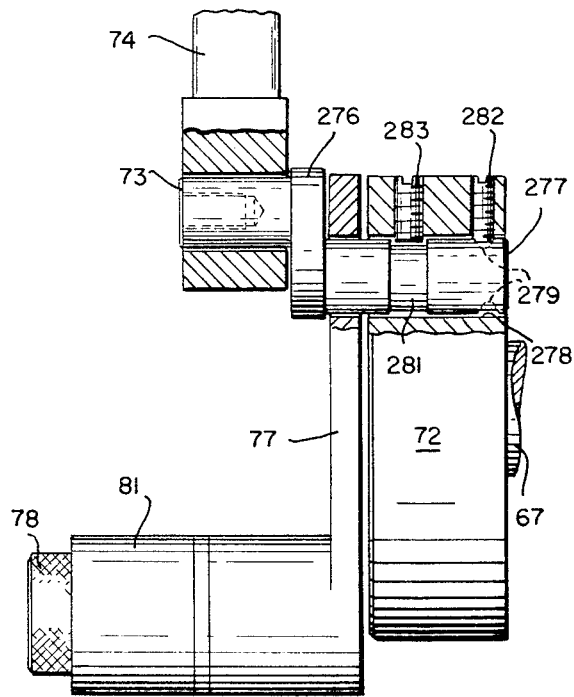
FIG. 14

MICROTOME

BACKGROUND OF THE INVENTION

1. Field of the Invention:

This invention relates to microtomes and, more particularly, to improved mechanisms for controlling the motion of the cantilever arm on which the specimen is mounted so that during each cycle of motion of the cantilever arm, the specimen is incrementally advanced with a high degree of precision toward the cutting knife and retracted therefrom during the return stroke of the cantilever arm to avoid damage to the specimen.

2. Description of the Prior Art:

Microtome mechanisms for controlling the advancing and retracting of the specimen relative to the cutting knife have been disclosed in such U.S. Pats. Nos. as 2,651,236, 2,739,507, 2,753,761, 2,822,726, 2,927,505, 2,948,190, 3,077,806, and British Patents 8,258, 732,217, 843,477 and 844,260, and Austrian Patent 182,539.

Although applicant is aware of the disclosures of these patents and of comparable mechanisms in other commercially available microtomes with whose possible patent coverage he is not familiar, he considers that they do not meet the high standards of reproducible accuracy and precision for cutting successive specimen sections that are desirable and necessary in contemporary technology for optical and electron microscopy.

SUMMARY OF THE INVENTION

The present invention is believed to overcome the limitations and deficiencies of prior art microtomes by providing an instrument which includes a highly accurate coordinated group of novel mechanisms for advancing the specimen incrementally toward the cutting knife, and causing the retraction of the specimen after sectioning has been performed so that the specimen bypasses the knife before the next advancing and cutting cycle takes place. The cantilever arm is pivotally mounted on a movable compound fulcrum which is amenable both to the setting of incrementally advancing fulcrum points for advancing the specimen toward the cutting knife, while at the same time, said fulcrum point is intermittently retracted for permitting the specimen to bypass the cutting knife during the remainder of each operating cycle of the cantilever arm. Automatically operating mechanisms coordinated with the rotation of the main drive shaft of the apparatus operate the specimen cantilever arm cycle, the advancing mechanism, and the retracting mechanism, all of these mechanisms being timed in sequence to perform their functions with a high degree of accuracy, precision, and reproducibility.

An important feature of the invention is the provision of a plurality of blocks pivotally mounted one on top of the other, said group of blocks forming a fulcrum for the cantilever arm which is movable incrementally forward for successive sectioning of the specimen and thereafter retracted to bypass the cutting knife. One of these blocks is pivotable to produce incremental advance of the cantilever fulcrum while another block pivotally mounted on the advancement block is movable in the opposite direction to cause the retraction of the cantilever fulcrum. Means are provided for independently operating the pivotal advancement block and the pivotable retraction block, separately in succession and in combination, those means being coordinated on a cyclic basis in conjunction with the cyclic movement of the cantilever specimen arm so that the requisite specimen advancement and specimen retraction takes place with a high degree of accuracy and reproducibility. While the cantilever arm fulcrum is moved rearwardly for retraction purposes, the minute incremental specimen advance is also operative during that retraction movement, after which the two pivoting blocks are locked in position in advance of the cutting stroke of the cantilever arm. Notwithstanding the mobility of the cantilever arm, fulcrum means are provided for ensuring the rigidity of said fulcrum during the cutting cycle of the cantilever arm so that accurate sectioning takes place with the requisite high degree of precision required by the modern technology of biological tissue examination and analysis.

In order to accomplish the foregoing objectives, the present invention discloses a number of novel, coordinated mechanisms for producing the advancement and retraction actions of the specimen holding cantilever arm.

Further objects of the invention are the provision of novel means for varying the thickness of the specimen section to be cut by the microtome knife, means for converting the apparatus from a regular microtome to an ultramicrotome, and means for altering the span of the cantilever arm stroke.

These and other novel features and advantages of the present invention will be described and defined in the following specification and claims.

BRIEF DESCRIPTION OF THE DRAWINGS

FIG. 1A is a schematic view of the tissue block holder mountable on the forward end of the cantilever arm shown in FIG. 1;

FIG. 2 is a front end view of the apparatus with the front wall of the cover plate removed, some parts being omitted and some parts being broken away;

FIG. 6 is a fragmentary side view of the rear portion of the interior mechanism of the apparatus showing the pivot mounting of the cantilever arm, some parts being omitted;

FIG. 6A is a fragmentary top view of the locking pawl mechanism shown at the bottom portion of FIG. 6, some parts being shown in section and some parts being omitted;

FIG. 7 is a rear view, somewhat reduced in size, of the mechanisms shown in FIG. 6;

FIG. 8 is an elevation taken approximately on line 8—8 of FIG. 3, some parts being omitted and some parts being shown in section;

FIG. 9 is a fragmentary side view of a portion of the apparatus shown in FIG. 8, some parts being omitted;

FIG. 10 is a greatly enlarged fragmentary rear view of a portion of the apparatus, some parts being omitted and some parts being shown in section;

FIG. 11 is a detailed exploded view of a tension control element utilized in two places in the apparatus shown in FIG. 2, some parts being shown in dotted outline;

FIG. 12 is an end view of the element shown in FIG. 11, some parts being shown in dotted outline;

FIG. 13 is a fragmentary interior side elevation of the apparatus, some parts being broken away, some parts being shown in section, and some parts omitted;

FIG. 14 is a greatly enlarged fragmentary view of a portion of the apparatus shown in FIG. 2, some parts being broken away and some parts being shown in section;

FIG. 15 is a fragmentary view of a portion of the mechanism shown in FIG. 14 with some parts thereof shown in an alternative position; and FIG. 16 is a greatly enlarged side elevation of a component of the mechanism shown in FIGS. 14 and 15, showing the position thereof as represented in FIG. 15 and showing in dotted outline the alternate position represented in FIG. 14.

DESCRIPTION OF THE PREFERRED EMBODIMENTS

Figure 1:
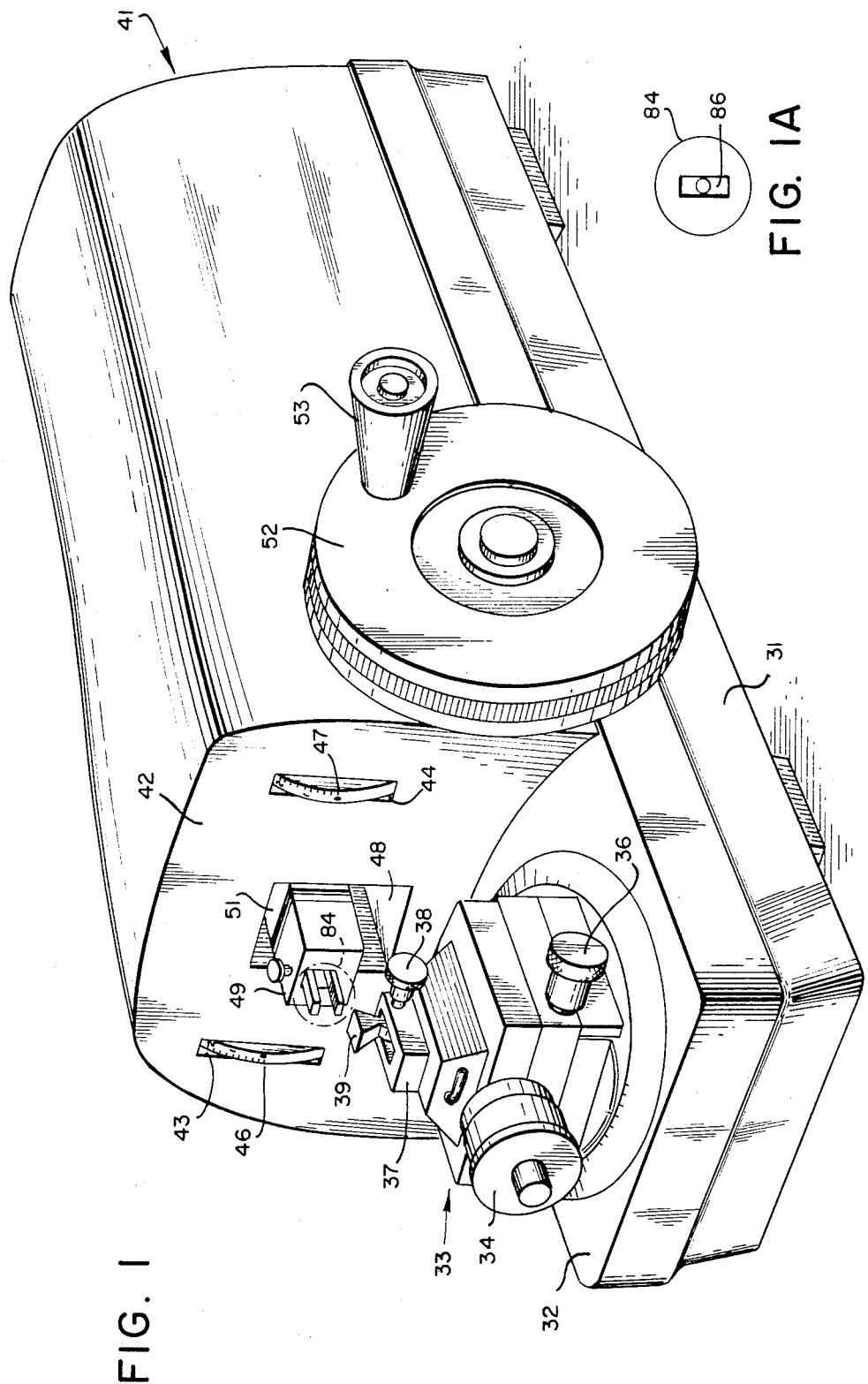
FIG. 1 is a perspective view of the apparatus of the present invention.

Referring now to the drawings in detail, the apparatus of the present invention, as shown diagrammatically in FIG. 1, is mounted upon a generally rectangular base 31, made of a suitable casting or the like. The horizontal surface of base 31 serves as a platform or deck 32, upon the forward end portion of which is mounted a universal knife stage assembly, generally designated 33, having a fine micrometer control 34 and a coarse micrometer control 36, both of said controls being suitably calibrated for adjusting the location of the cutting knife and securing the latter in position.

Mounted on top of stage assembly 33 is a knife holder assembly 37 having an adjustable clamping screw 38 for securing a biological specimen cutting knife 39 in position. The mechanisms for producing the requisite adjustments and for positioning the various parts of the micrometer stage assembly and the knife holder assembly are well known in the art and form no part of the invention claimed herein.

The remaining portion of deck 32 is covered by a removable hood, generally designated 41, the top, side walls, and rear of which form an enclosure for the operating parts of the apparatus herein. The front wall 42 of hood 41 has spaced, vertical apertures 43 and 44 through which extend arcuate portions of a thickness indicator disc 46 and a position indicator disc 47, respectively. The central portion of wall 42 has a rectangular aperture 48 through which extends a specimen holder support 49 mounted on the forward end of a pivoting cantilever arm 51.

Mounted externally of the side wall of hood 41 is a rotatable hand wheel 52 which also serves as a fly wheel and which is manually rotated clockwise by handle 53. The rotation of hand wheel 52 operates the various mechanisms for pivotally moving the cantilever arm 51 and for controlling the intermittent advance and retracting mechanisms for said cantilever arm as will be described in detail hereinafter.

Secured firmly in base 31 is a pair of substantially identical, upwardly extending, spaced apart support walls 54 and 56, said walls extending longitudinally along a portion of the length of base 31. See FIG. 2. The forward upper portions of walls 54 and 56 each have integrally formed, upwardly extending bosses 57 and 58. See also FIG. 13. Walls 54 and 56 extend downwardly into a recessed well 59 formed in deck 32 (FIG. 3) within which some of the mechanisms of the apparatus are located, and wherein some of the moving parts are operative. The rear end portions of support walls 54 and 56 are bounded by a rear support wall 61 (FIG. 6), the bottom of which extends downwardly and terminates in the floor 62 of well 59. In some embodiments, support walls 54, 56 and 61, may be formed of a single casting to form a box-like support structure firmly secured in base 31. Furthermore, floor 62 of well 59 may also be part of a unitary casting which includes the box-like structure of walls 54, 56 and 61.

Mounted adjacent wall 56 and deck 32 is a gear box 66 to the rear portion of which is optionally connected a rearwardly extending drive shaft, not shown, which may, in turn, be connected to an electric motor or the like for automatically operating the apparatus herein. See FIG. 2.

Extending horizontally through gear box 66 and support wall 56 and mounted in suitable bearings therein, not shown, is a main drive shaft 67, the outer end portion of which extends through a journal 68 and to which is connected hand wheel 52 for manual rotation of said main drive shaft.

Mounted on support wall 56 is a brake assembly 69 through which shaft 67 extends. Brake assembly 69 contains suitable mechanisms including a one-way clutch, not shown, cooperating with shaft 67 to prevent reverse rotation of said shaft as a safety factor to prevent accidents to the biological specimen carried by the specimen holder support 49 and for locking the movable mechanisms of the apparatus to facilitate mounting and removing of specimens on the cantilever arm and when adjusting and positioning cutting knife 39.

Mounted fast upon and rotated by shaft 67 is a retracting cam 71 (FIG. 3), the function of which will be described hereinafter.

Also mounted upon and rotated by the inner end of main shaft 67 is a block 72 having a pivot pin 73 extending laterally from the left surface thereof and being located off-center from the axis of shaft 67. Freely pivotally mounted on pin 73 is an upwardly extending cantilever arm connecting rod 74, the upper end of which is pivotally mounted on pivot pin 76 mounted transversely in cantilever arm 51 and extending cross a bottom recess in said arm which accommodates the upper portion of said connecting rod for free pivotal motion therein. See FIGS. 2 and 3. The rotation of wheel 52 and shaft 67 produces the circular motion of pivot pin 73 whereby connecting rod 74 is moved reciprocably to cause the reciprocal upward and downward pivoting motion of cantilever arm 51 and specimen holder support 49 mounted thereon.

Mounted pivotally on another portion of pin 73 is the upper end portion of a rigid link 77, the lower end of which is pivotally connected to a pivot pin 78 to which is also connected pivotally the forward end of an angled actuating lever 81. The intermediate portion of lever 81 is pivotally mounted by means of a suitable bearing on a pivot pin 82 secured on a horizontal inwardly extending post 83 on support wall 54. By virtue of the freely pivoting linkages comprising connecting rod 74 and link 77, the rotation of shaft 67 by wheel 52 causes the coordinated pivoting motions of cantilever arm 51 and actuating lever 81. The location of pivot pin 73 and the respective dimensions of rod 74 and link 77 can be determined to produce the requisiste relative timing of the coordinated movements of cantilever arm 51 and actuating lever 81, respectively.

Mounted on the forward end of specimen holder support 49 is a specimen holder 84 in the forward face of which may be embedded or otherwise suitably mounted, a paraffin block 86 containing an embedded biological specimen to be sectioned by knife 39. See FIGS. 1 and 1A. In order to cut slices of predetermined thickness from the specimen in block 86, it is necessary for said specimen to pass downwardly across the cutting edge of knife 39 after which it passes upwardly in its cycle to return to a position for the next sectioning step to take place. In view of the critical precision requirements of tissue sectioning for microscopic and ultra-microscopic examination and study, it is important that on the upward return motion of cantilever arm 51 the specimen be retracted from the path of knife 39 so that ample clearance will be provided therefor. Accordingly, it is an important feature of the invention to provide not only for the intricate compound movement of the specimen relative to the knife, but also to provide for the extremely fine and accurately controlled incremental advance of the specimen during each cutting cycle to ensure obtaining the desired ultra-thin successive sections to be cut by the knife. Furthermore, provision must be made to vary the thickness of the tissue sections at the choice of the operator of the apparatus, this variable feature being coordinated also with the advancing and retracting mecahnisms for the cantilever arm 51.

In order to accomplish the foregoing, the rear end of cantilever arm 51 is pivotally connected to a compound pivoting arrangement which is supported on rear wall 61. See FIGS. 3, 6 and 7. Mounted on top of wall 61 is a laterally extending knife bearing base 87, in the top surface of which is a laterally extending V-shaped bearing seat 88. Located above base 87 is a laterally extending thickness control block 89 on the bottom surface of which is mounted a laterally extending V-shaped knife bearing 91, the downwardly extending apex of which rests pivotally in bearing seat 88. Mounted on the top surface of thickness control block 89 is a laterally and upwardly extending V-shaped knife bearing 92.

Pivotally mounted on knife bearing 92 is a laterally extending retraction block 93, in the bottom surface of which is a recessed V-shaped bearing seat 94 which cooperates with the apex of bearing 92. The top surface of retraction block 93 is provided with a downwardly recessed V-shaped bearing seat 96. Pivotally supported on top of retraction block 93 is a cantilever arm bearing block 97, on the bottom surface of which is mounted a downwardly extending V-shaped knife bearing 98, the apex of which rests in, and pivotally cooperates with, the apex of bearing seat 96. Mounted fast upon block 97, by means of bolts 99, is the rear end of cantilever arm 51 which moves pivotally with block 97.

Mounted on and extending rearwardly of the rear surface of block 97 is a pair of spaced studs 101 to each of which is connected the upper end of a respective cantilever arm return spring 102, the bottom end of which is connected to a corresponding rearwardly extending stud 103 mounted on the rear surface of support wall 61. Springs 102 normally urge block 97 to pivot in a clockwise direction as viewed in FIGS. 3 and 6.

Block 89 has a pair of spaced, rearwardly extending studs 104 to each of which is connected the upper end of a respective thickness control return spring 106, the lower end of which is connected to a corresponding rearwardly extending stud 107 mounted on the rear surface of support wall 61. Springs 106 normally urge block 89 to pivot in a clockwise direction as viewed in FIGS. 3 and 6. The other functions of return springs 102 and 106 will be described hereinafter.

Mounted fast upon the rear portion of block 93 and movable pivotally therewith is the upper end portion of a retracting lever arm 108, said arm being secured to block 93 by means of bolts 109. Arm 108 extends downwardly and terminates in an integrally formed, forwardly extending finger 111. Secured to the bottom portion of arm 108 is a rearwardly extending stud 112. The forward portion of arm 108 has a recess 113 which accommodates the upper portion of a return leaf spring 114 secured therein by means of screw 116. The lower free end portion of leaf spring 114 bears against the rear wall of support wall 61 and normally urges the lower end of retracting arm 108 in the rearward direction, by which action retraction block 93 is also urged pivotally in the same counterclockwise direction.

Mounted on the lower rear surface portion of support wall 61 is a support bracket, generally designated 117 (see FIG. 6A). Bracket 117 consists of a pair of spaced feet 118 secured to support wall 61 by means of bolts 119. Integrally formed with each foot 118 is a rearwardly extending leg 121, both of said legs being joined by an integrally formed crossbar 122 intermediate the ends thereof. Secured between the rear end portions of legs 121 is a pivot pin 123 rotatably accommodating a journal 124 which is integrally formed on an L-shaped locking pawl 126 to cooperate with retracting lever arm 108.

Locking pawl 126 has a generally upwardly extending integrally formed arm 127 in the upper end portion of which is located an adjustable screw 128, the inner end of which cooperates with the rear end surface of stud 112. Locking pawl 126 has a lower forwardly extending leg 129 which terminates in an upwardly extending toe 131. Coiled around pin 123 in the space between the end of journal 124 and the inner wall of leg 121 is a spring wire 132, one end portion of which rests upon the top surface of crossbar 122 while the other end 134 thereof bears against the forward sloping wall of arm 127 of pawl 126. Thus, spring 132 normally urges the pivotal motion of locking pawl 126 in the clockwise direction as viewed in FIGS. 3 and 6.

Embedded securely in the rear surface of the lower end portion of lever arm 108 is a ball 108A. Threadably mounted in cross bar 122 is a screw 122A, the forward end of which bears against ball 108A in order to secure lever arm 108 rigidly in position when tow 131 engages finger 111 in the locked position as shown in FIG. 6. In this locked position, lever arm 108 as well as block 93 are prevented from moving or vibrating so as to ensure the stability of the pivot fulcrum of cantilever arm 51 when the latter is performing its downward cutting stroke, thereby achieving precision sectioning of the specimen by the cutting knife. Screw 122A may be adjusted relative to cross bar 122 and to ball 108A in order to produce a close and firm abutment for the bottom portion of arm 108.

Secured to the side surface of arm 127 is a laterally extending pin 136 on which is pivotally mounted the rear portion of a link 137 to the forward portion of which is connected an elongated actuating retracting rod 138 which extends generally forwardly, with the forward end thereof being pivotally connected by means of pin 139 to the upper end portion of retracting roller cam bracket 141. See FIGS. 2 and 3. Bracket 141 is connected pivotally at its lower end to the outer end portion of a pivot pin 42, the inner end of which is connected to support wall 56. In one embodiment, bracket 141 has a U-shaped cross-section, and intermediate its ends there is mounted a pin 143 which rotatably supports cam roller 144 which rides on the contoured surface of retracting cam 71.

As shaft 67 rotates, thereby rotating retracting cam 71 therewith, roller 144 descends along a slope toward low surface 146 from high surface 147 of cam 71 by the action of spring 132 operating by way of rod 138 whereby bracket 141 is moved pivotally clockwise accompanied by the simultaneous clockwise pivoting motion of locking pawl 126. This locking action takes place during the interval or transit of roller 144 from the high surface toward the low surface of cam 71. During continued rotation of shaft 67, while locking pawl 127 is engaged with lever arm 108, roller 144 remains slightly spaced apart from the low surface 146 of cam 71 until the rising slope toward high surface 147 is reached, at which time roller 144 is again activated by said slope to cause the counterclockwise pivoting motion of locking pawl 127 whereby toe 131 descends out of engagement from finger 111 to release lever arm 108 and to permit the clockwise pivoting motion thereof and of retraction block 93 against the action of spring 114. This action brings about the retraction of blocks 93 and 97 during the upward pivoting return stroke of cantilever arm 51.

Figure 3:
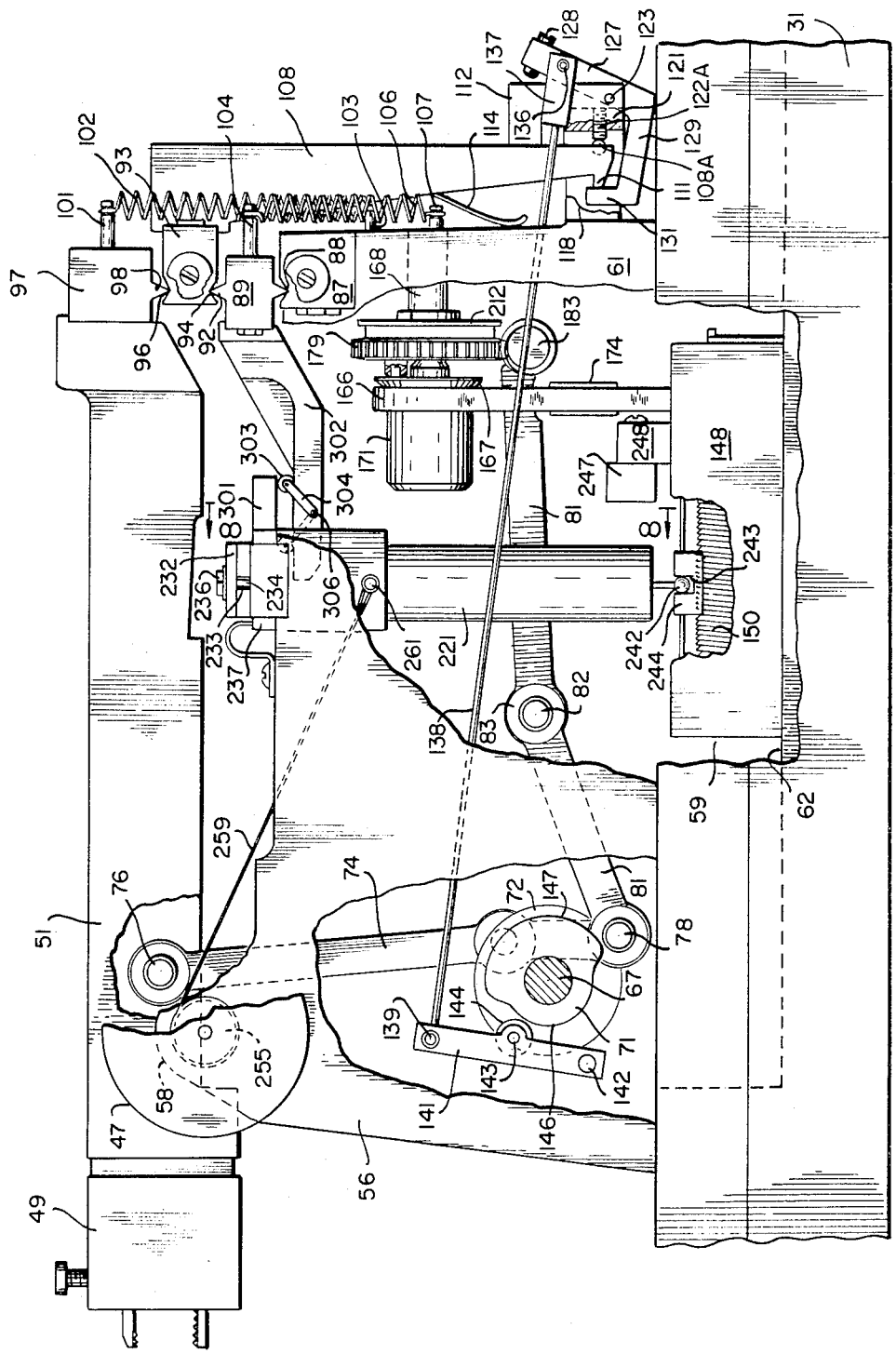
FIG. 3 is a fragmentary side view of the interior of a portion of the interior mechanism of the apparatus herein, some parts being omitted, some parts being in section, and some parts being broken away.

The contours of cam 71 are determined empirically and their relationship to shaft 67 is established whereby during the downward movement of rod 74, causing the downward pivoting motion of cantilever arm 51 and during the cutting action of the microtome, roller 144 is spaced slightly apart from low surface 146 of cam 71 to cause pawl 126 to be rotated into and fixed in its position as shown in FIGS. 3 and 6, whereby toe 131 and screw 122A hold retracting arm 108 captive in a fixed, locked position during the downward cutting movement of cantilever arm 51.

When retracting arm 108 is locked in position, block 93 is also locked in position relative to block 89 whereby the only pivoting action that takes place is that of cantilever arm 51 on knife bearing 98 resting in bearing seat 96 of block 93. Thus, during the downward movement of specimen holder 84, when the slicing action of the specimen takes place, the only pivoting action that takes place occurs on the edge of knife bearing 98 in stationary bearing seat 96 since block 93 is maintained rigidly in position by virtue of the locking action of pawl 126 on retracting arm lever 108, as described hereinbefore.

Upon further rotation of shaft 67, cantilever arm 51 is moved upwardly by links 77 and rod 74, while roller 144 reaches and rides upon the high surface 147 of cam 71. This causes the counterclockwise pivotal motion of cam bracket 141 which, by way of actuating retracting rod 138, causes corresponding counterclockwise pivoting motion of pawl 126 whereby toe 131 descends to release finger 111 of lever arm 108. Also, by this action, the inner end of screw 128 bears against the outer end of stud 112 and produces the clockwise pivoting retracting motion of lever arm 108 against the action of spring 114.

The clockwise pivoting motion of arm 108 simultaneously produces the clockwise pivoting motion of block 93 which causes bearing seat 96 to be retracted rearwardly. By this action, the pivot locus between the edge of bearing 98 and bearing seat 96 is moved or retracted rearwardly causing the rearward retraction of bearing block 97 as well as the retraction of cantilever arm 51 of specimen holder 84 and the specimen therein during the upward motion of cantilever arm 51. Accordingly, after the specimen has been sliced by the cutting edge of knife 39 during the downward movement of cantilever arm 51, the specimen is automatically retracted during the upward movement of the cantilever arm whereby it freely bypasses the edge of knife 39 and damage to said specimen is obviated. The dimensions of blocks 97, 93 of lever arm 108, and the location of the bearings and bearing seats are selected and determined in order to provide for the requisite clearance of the specimen for free movement past the cutting knife during the upward movement of cantilever arm 51.

When the specimen has traversed a single, complete cutting cycle during the downward movement of cantilever arm 51, it is necessary to advance the specimen a predetermined distance for causing it to be sliced again by knife 39 during the next downward movement of cantilever arm 51. The specimen advancing system includes rectangular housing 148 which is securely mounted on floor 62 of base 31. See FIGS. 3, 4 and 5. Mounted longitudinally in the center of housing 148 is a lead screw shaft 149, the larger surface portion thereof of greater diameter being formed with screw threads 150, said shaft being mounted at its respective ends on bearing balls 151 and 152. Bearing ball 151 is seated in centering shaft 153 secured on one end wall of housing 148. Connected by bolts 154 to the top of the other end wall of housing 148 is a bracket 156 that has an integrally formed, downwardly extending leaf spring 157 spaced apart from the inner surface of said end wall and having a suitable bearing seat accommodating bearing ball 152. Spring 157 performs the function of maintaining rearward biasing pressure upon lead screw shaft 149 thereby contributing to the prevention of lost motion on the part of said lead screw shaft.

The right end of shaft 149 is driven by a one-way indexing clutch 158 which is mounted fast within an indexing clutch sleeve 159 formed integrally and axially with sleeve 161 of slightly smaller diameter. Bearing sleeve 162 is mounted fast within indexing clutch sleeve 161. Sleeve 162 is rotatable around centering shaft 153. Mounted fast on sleeve 161 is a timing belt pulley 163 having a flange 164, the rotation of said pulley causing the rotation of bearing sleeve 162, sleeve 161, clutch sleeve 159 and one-way indexing clutch 158 to drive the right end of lead screw shaft 149.

The outer periphery of pulley 163 is engaged for rotation by a control belt 166 which extends vertically and is engaged by the periphery of the timing belt pulley 167 located above pulley 163.

Pulley 167 is mounted for free rotation around forwardly extending shaft 168 mounted fast in support wall 61. Mounted upon the forward end of shaft 168 by means of set screw 169 is a retaining cup 171 in the interior of which is located a torsion spring 172, one end of which is secured to the left end interior wall of retaining cup 171 (FIG. 4), the other end of which is connected to pulley 167. Secured to belt 166, by means of pin 173, is an abutment block 174 on which is integrally formed a laterally extending slide guide 176 having a pair of outwardly extending arms 177, both of which have aligned vertical apertures which freely accommodate and reciprocally traverse a vertical guide post 178, the lower end of which is secured fast on the side wall of housing 148. See FIG. 10. Block 174 and guide 176 may be made of nylon or the like.

Normally, torsion spring 172 causes the counterclockwise return movement of pulley 167 which normally lifts abutment block 174 and slide guide block 176 to an upper predetermined position as will be described hereinafter. With each cycling rotation of shaft 67, actuator lever 81 is moved pivotally and cyclically whereby the rear end of lever 81 which is poised above abutment block 174 intermittently abuts and bears down upon said block and causes the downward movement of the time control belt 166 on the right side thereof as shown in FIG. 10, thereby intermittently producing a rotation in unison with indexing clutch 158 which, in turn, causes the rotation of lead screw shaft 149.

The downward movement of abutment block 174 by actuator lever 81 is exerted against the force of torsion spring 172. Accordingly, the distance through which abutment block 174 travels under the action of lever 81 produces a determined fixed rotation of lead screw shaft 149. The rear end portion of lever 81 is not always in abutment with block 174 when the rear end of said lever rises to the uppermost limit of its motion.

The extent to which lead screw shaft 149 rotates can be varied by positioning block 174 at a desired level relative to housing 148 in order to vary the thickness of the microtome cut. This is accomplished by means of a worm gear 179 mounted on shaft 168, said worm gear having a forwardly extending stop element 181 which cooperates with a rearwardly extending pin 182 for producing a base location for block 174. Worm gear 179 is rotated by worm 183 rotatably mounted on shaft 184 which is rotatably secured in support wall 54. Mounted fast on the outwardly extending portion of shaft 184 is a sprocket wheel 186 engaged by sprocket chain 187 which, in turn, is rotated by sprocket wheel 188 mounted on shaft 189 rotatably journalled in support wall 54. Mounted fast on the outer end of shaft 189 is a thickness control knob 191 for manual rotation of sprocket wheel 188 which, in turn, produces the rotation of worm gear 179 by way of the mechanisms described hereinafter. See also FIG. 13. The thickness of the microtome slice from the specimen that is desired may be determined visually by means of thickness indicator disc 46 whose periphery is marked with suitable graduations which can be read in conjunction with a suitable index mark on front wall 42 of hood 41. Indicator disc 46 is mounted on a shaft 192 rotating within stationary bushing 193 mounted in the upper portion of support wall 54.

Secured to and rotatable with shaft 192 by means of screw 194 is a tension control element 196, a portion of which is shaped in the form of a pulley 197. As illustrated in FIGS. 11 and 12, there is located within the interior of tension control element 196 in the region of pulley 197, a coiled tension spring 198, one end portion 199 of which extends into slot 201, the other end portion 202 extending into slot 203 in the end wall of bushing 193. The tension of spring 198 normally urges disc indicator 46 to move in the clockwise direction as viewed in FIG. 13.

One end of a tension control cable 206 is secured fast in the groove of pulley 197, said cable passing toward and cooperating with idler pulley 207 mounted by means of post 208 to support wall 54, and thence around horizontal idler pulley 209 mounted on bracket 211 secured to the rear support wall 61. Cable 206 then extends partially around pulley 212 which is secured to worm gear 179 and rotates therewith. See FIGS. 10 and 13. The end of cable 206 is secured fast within the groove of pulley 212. When knob 191 is rotated to establish the desired thickness of the specimen slice, as indicated by the gradations on the rim of wheel 46, said wheel is maintained in clockwise tension against cable 206 by the action of spring 198 whereby lost motion is obviated between said indicator wheel and the thickness control mechanisms comprising worm 183, worm gear 179, belt 166, and block 174. Thus, the accuracy of the readings of the gradations on the rim of disc indicator 46 is ensured.

The section thickness of the specimen cut by knife 39 is determined by the extent to which timing belt 166 moves against the action of torsion spring 172 during each intermittent downward movement of the rear end of actuating lever 81 causing a downward movement of block 174 which, in turn, causes the incremental rotation of lead screw shaft 149. By manipulating thickness control knob 191, the precise desired base location of block 174 is established by a visual reading of the calibrated gradations on the rim of disc 46. According as the base position of block 174 is established higher or lower, the rear end of lever 81 will concomitantly move said block a corresponding longer or shorter distance, thereby producing a greater or lesser rotation of lead screw shaft 149. The extent of the arcuate distance that the finely accurate lead screw threads 150 on shaft 149 rotate determines the thickness of the section that is cut from the moving specimen by knife 39.

During the upward movement of the rear end of lever 81 which becomes retracted from block 174, torsion spring 172 acts to rotate pulley 167 in the reverse direction until pin 182 abuts and is stopped by stop pin 181 on worm gear 179 whereby block 174 is returned to its previously established base position ready for the next cycle of specimen cutting. The reverse rotation of pulley 167 and the concomitant reverse movement of belt 166 working through one-way indexing clutch 158 does not effect lead screw shaft 149 which remains stationary during the downward cutting stroke of specimen carrying cantilever arm 51. The rotation of lead screw shaft 149 and of lead screw threads 150 takes place only during the upward return stroke of said arm.

The incremental cutting of the specimen by knife 39 is controlled by the pivoting motion of a vertical fork 221 having a pair of spaced, upwardly extending arms 222 and 223. See FIGS. 3, 8 and 9. Secured firmly in vertical recesses 224 in arms 222 and 223 by means of set screws 225 is a knife body 226, the upper portion of which terminates in a horizontal wedge-shaped knife bearing 227. See FIG. 13. Secured on the top of support walls 54 and 56 by means of bolts 228 are respective inwardly extending bearing blocks 229, the bottom surfaces of which are recessed in the form of upwardly extending V-shaped grooves 230 that serve as bearing seats with which knife bearing 227 cooperates.

Forming a bridge between, and resting on the top surfaces of block 229, is a fork-retaining spring plate 232, the ends of which have slots 233 within each of which is located a vertical pin 234 secured in blocks 229. Pins 234 are spaced from the inner walls of slots 233 and serve to locate spring plate 232 upon blocks 229 while, at the same time, flexing of said plate may occur without hindrance that would otherwise be incurred should the ends of plate 232 be secured fast upon blocks 229. See FIGS. 3, 4, 8 and 9.

In the space between arms 222 and 223, knife body 226 has an upper central recess which freely accommodates an eye bolt 235, the shank of which extends upwardly through a suitable aperture in plate 232, the end of said shank being engaged by nut 236. The center portion of knife body 226 is enclosed on the top of arms 222 and 223 of fork 221 by means of retaining plate 237 secured to said arms by bolts 238. Plate 237 has a central aperture through which the shank of eyebolt 235 extends freely. The bottom portion of plate 237 has an upwardly extending V-shaped groove 239 which accommodates a pin 240, the upper portion of which is V-shaped to fit snugly into said V-shaped groove, while the bottom surface of said pin is provided with a horizontal flat against which the central top edge portion of knife bearing 227 is urged when plate 237 is fixed in position. Pin 240 is prevented from moving laterally within groove 239 by means of spaced pins 241 extending through plate 237 and into said groove. The loop of eyebolt 235 encircles pin 240 and when nut 236 is threadably tightened on the shank of said bolt urging the latter upwardly along with the assembly of fork arms 222, 223 and knife body 226, it also urges the apices of the outer portions of knife bearing 227 into the apices of bearing seats 230 in blocks 229. Plate 232 produces a suitable spring loading between bearing 227 and bearing seats 230 to ensure the requisite cooperation therebetween. At the same time, pivot action of fork 221 relative to stationary block 229 and stationary spring plate 232 is permitted by the free pivoting relationship between pin 240 and the loope of eye bolt 235.

Figure 4:
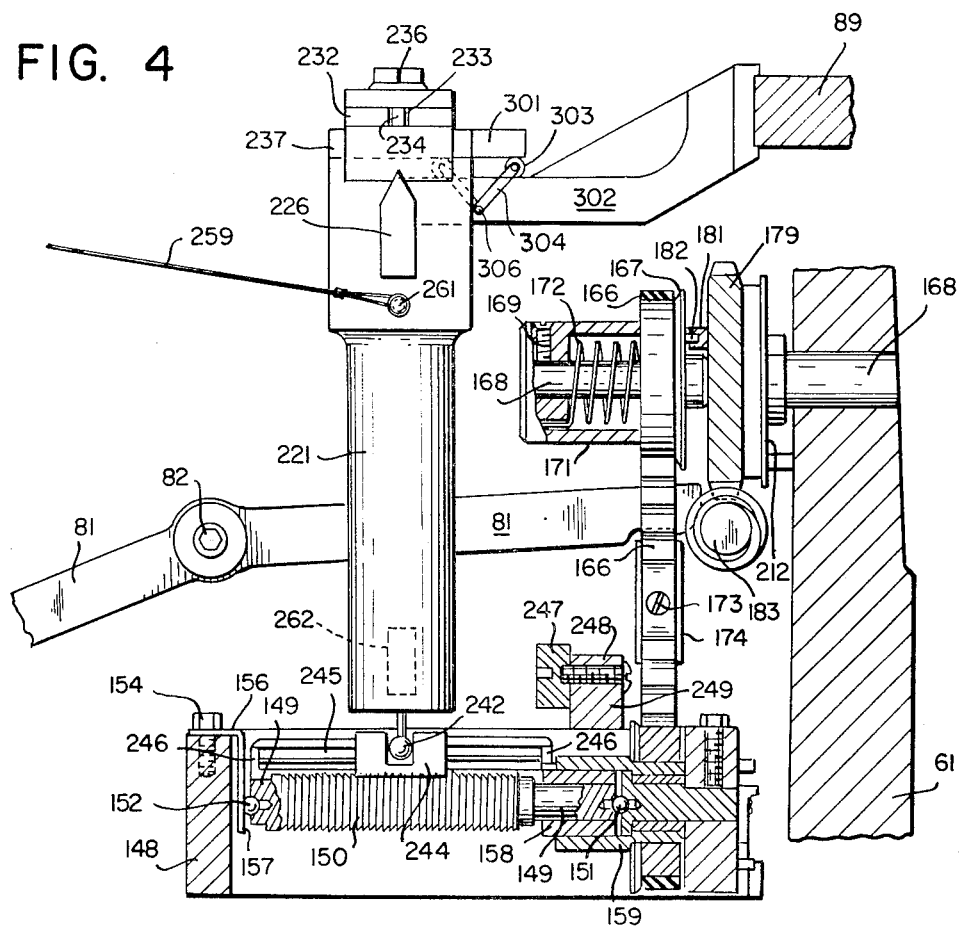
FIG. 4 is a greatly enlarged fragmentary view of a portion of the apparatus shown in FIG. 3, some parts being shown in section and some parts being omitted.
Figure 5:
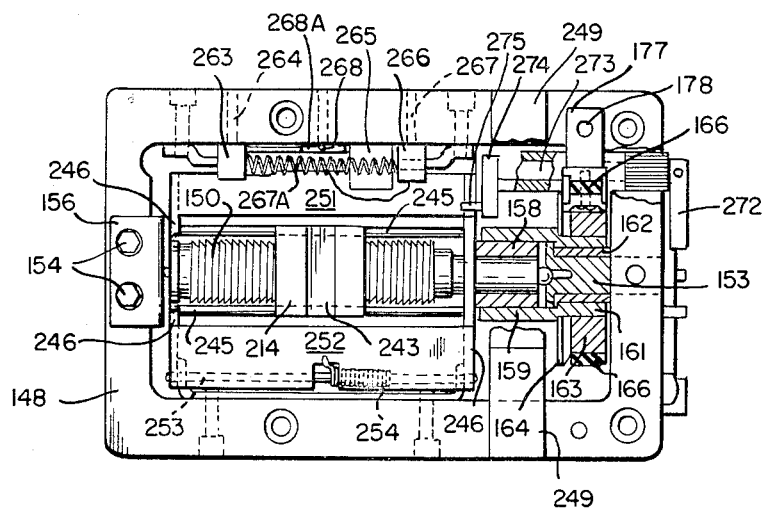
FIG. 5 is a plan view, some parts in section, of the advancing mechanism shown at the bottom portion of FIG. 4, some parts being omitted and some parts being shown in section.

Connected to the bottom end of fork 221 is a follower ball 242 which cooperates with the recess 243 of lead screw nut 244 made of a suitable plastic material such as nylon or the like. (FIGS. 3, 4 and 5). In the vicinity of nut 238, the bottom of cantilever arm 51 is recessed so that there is no interference with the free pivoting action of said arm.

The bottom surface of nut 244 has an arcuate recess which is threaded for cooperation with threads 150 of lead screw shaft 149. Also, nut 244 has a pair of spaced, longitudinal bores (not shown) through which extend respective spaced longitudinal, parallel guide rails 245, the respective ends of which are mounted in pivotable lift levers 246 whereby nut 244 may be lifted away, when desired, from engagement with lead screw threads 150, the upward movement of said nut being permitted by the fact that the bottom of follower ball 242 is normally spaced apart somewhat from the floor of socket recess 243 while yet engageable by the lateral inner walls of recess 243.

The rearward motion of the bottom of fork 221 is limited by a stop element 247 made of a resilient and shock absorbing material such as felt, rubber, or the like, on block 248 which is mounted centrally on a bridge 249 which laterally spans and is secured upon the longitudinal walls of housing 148.

Lift levers 246 form part of a pivotable frame comprising parallel longitudinal bars 251 and 252, bar 252 being pivotally mounted on a longitudinal pivot pin 253. Coiled around pivot pin 253 is a spring 254, the ends of which are anchored in a manner to urge the lever frame downwardly so that the threads on nut 244 will normally engage lead screw threads 150. When fork 221 is moved to its forward extreme position by the rotating action of lead screw shaft 149, automatic means are provided for operating the pivot frame to lift nut 244 from lead screw threads 150 so that the lower end of said fork may become retracted to its starting position in abutment with stop element 247.

Lost motion between screw nut 244 and lead screw threads 150 is prevented by the action of springs 106 normally causing clockwise pivoting motion of thickness control block 89 and thickness control arm 302 pivotally engaging stub 301 to produce a biasing action urging fork 221 to move pivotally in the counterclockwise direction whereby the threads on the bottom surface of nut 244 are urged into intimate contact with lead screw threads 150. See FIGS. 2, 3, 4, 6 and 7. Tension control element 255 is mounted on a shaft 256 rotatable within stationary bushing 257 mounted in boss 58. Connected to tension control element 255 is a pulley 258 into the groove of which is secured one end of a cable 259, the other end of which is connected to a laterally extending pin 261 mounted on the side of fork 221. Cable 259 is maintained in just sufficient tension to provide accurate measurement of the location of screw nut 244 relative to lead screw shaft 149 as can be read on the graduated scale on the periphery of position indicator disc 47 which rotates with shaft 256.

Position indicator disc 47 has suitable gradations on its periphery which can be read against a suitable index mark on front wall 42 of hood 41. As the bottom of fork 221 moves pivotally and incrementally by the intermittent rotation of lead screw shaft 149, the interior spring element within tension control element 255 which maintains cable 259 taut, causes the coordinated intermittent rotation of position indicator disc 47 whereby the operator of the apparatus can monitor the position of nut 244 relative to the respective ends of lead screw 149. A zero reading on indicator disc 47 is coordinated with the location of nut 244 at the beginning or right end of lead screw threads 150. See FIGS. 4 and 5. By reading the gradations on indicator disc 47, the operator of the apparatus is informed as to the location of nut 244 relative to lead screw threads 150 and can determine when said nut is near the end of its traverse on said lead screw. The reading on disc 47 signals to the operator the amount of sectioning of the specimen that can further take place as well as when the apparatus should be adjusted to reset nut 244 back to the beginning end of screw threads 150.

The lower portion of fork 221 has a laterally extending stub 262 which, at or near the forward limit of motion of said fork, engages the upper portion of a lift actuator 263 pivotally mounted on a pin 264 in the wall of housing 148. When lift actuator 263 is moved pivotally by stub 262, said actuator releases and allows the pivoting motion of another lever which has a laterally extending lift tab 265 which moves upwardly engaging bar 251 to cause the pivotal lifting of lift levers 246 and the raising of guide rails 245 thereby disengaging nut 244 from lead screw threads 150 against the action of spring 254 whereupon fork 221 is automatically retracted against the action of cable 259 and tension control element 255. The rearward pivoting motion of fork 221 is produced by the biasing action of springs 106 acting through block 89, arm 302, and stub 301. As the bottom of fork 221 moves rearwardly, ball 242 at the lower end thereof causes nut 244 also to move rearwardly on rails 245 to a beginning position relative to screw threads 150. The location of stop element 247 against which the lower portion of fork 221 abuts during this resetting operation also determines the beginning location of nut 244 relative to screw threads 150.

During the rearward pivoting motion of fork 221, stub 262 abuts the top of hinge release actuator 266 pivotally mounted on pin 267 in the side wall of housing 148. The pivoting action of release actuator 266 causes the release of lift tab 265 whereby the latter moves downwardly disengaging from bar 251, permitting spring 254 to cause the pivoting downward motion of lift levers 246 whereby nut 244 descends upon lead screw shaft 149 so that said nut and lead screw threads 150 become engaged once again and the micrometry process can proceed again.

The activation of tab 1265 by mechanisms associated with lift actuator 263 and release actuator 266 is accomplished by means of a spring 267A connected between said actuators as well as spring rod 268, the bottom of which is secured fast in a plate 268A pivotally mounted on the inner surface of the wall of housing 148. Plate 268A has forwardly and rearwardly extending arms which are engaged by latch notches (not shown) on lift actuator 263 and release actuator 266, respectively. While said arms are engaged by said latches, the bottom of pin 268 is immobile while the upper portion thereof is flexed, under tension, in forward or rearward direction within the aperture of loop 269 formed on the end of downwardly extending rod 271 connected to a portion of fork 221. See FIG. 8.

When fork 221 moves forwardly and stub 262 engages release actuator 263 the latter, moving pivotally, unlatches plate 268A which, under the tension of spring rod 268, also moves pivotally counterclockwise to cause tab 265 to move upwardly and pivotally to lift the framework comprising levers 246 and bars 251 and 252, thereby lifting nut 244 from screw threads 150. During this action, when actuator 263 has moved pivotally, release actuator 266 also moves pivotally under the action of spring 267A connected between said two actuators whereby the latching action of actuator 266 again immobilizes plate 268A during the rearward movement of fork 221 and of nut 244. When stub 262 engages release actuator 266 to cause the latter to release plate 268A, the tension of spring rod 268 causes the pivotal motion of plate 268A whereby lift tab 265 moves downwardly to permit bar 251 to descend thereby causing nut 244 to descend again upon screw threads 150. During this last action of release actuator 266, spring 267A performs the same function but in the reverse direction upon lift actuator 263.

While fork 221 moves pivotally in either direction, it causes the upper portion of spring rod 268 to flex until stub 262 engages either lift actuator 263 or release actuator 266 at which time the pivotal motion of the respective actuator causes the upward or downward motion of tab 265 in lifting or lowering the framework comprising levers 246 and bars 251 and 252. The mechanisms on housing 148 which control the raising and lowering of nut 244 relative to lead screw threads 150 are within the purview of the prior art but are described here in part in order to comprehend the operation of the other novel portions of the apparatus herein.

The pivoted assembly for lifting and lowering threaded nut 244 relative to lead screw threads 150 may also by manually operated by means of suitable linkage, not shown, manipulated externally of the apparatus and connected to a lift arm pawl 272 which is pivotally mounted on a rotatable shaft 273 extending through an end wall of housing 148. Mounted on the interior end of shaft 273 is a block 274 having a longitudinally extending eccentrically located pin 275 which is located beneath the bar 251. See FIGS. 5 and 10. When lift arm pawl 272 is raised, pin 275 is also raised to engage bar 251 thereby lifting the frame supporting nut 244 to disengage the latter from screw threads 150 whereupon springs 106 cause the automatic retraction of fork 221 as described hereinbefore. Then pawl 272 is released, pin 275 descends and permits nut 244 to descend upon screw threads 150.

In some embodiments, it is desirable to change the limits of the pivoting stroke of cantilever arm 51. As shown in the schematic illustration of FIG. 2, cantilever arm 51 moves pivotally in a comparatively wide ranging stroke to move the specimen across the cutting knife. Under some conditions of micrometry, it is necessary to cause the cantilever arm to move the biological specimen only a short distance spanning the cutting knife. The means for providing the variability of the stroke of cantilever arm 51 is shown structurally in FIGS. 14, 15 and 16, where pivot pin 73 is mounted off-center on an eccentric block 276 having an oppositely extending off-center pin 277 which is accommodated freely within aperture 278 in block 72. Formed near the outer end of pin 277 are two cone-shaped recesses 279 located 180° apart. Formed intermediate the end of pin 277 is a second annular recess 281. In order to postion pin 73 for the wide swing stroke of cantilever arm 51, eccentric block 276 is positioned in the location shown in FIG. 14 and secured therein by means of set screw 282 firmly engaging one of the coneshaped recesses 279. When, however, it is desired to provide a short stroke for cantilever arm 51, set screw 282 is loosened and eccentric block 276 is reversed 180° into the postion shown in FIG. 15, after which set screw 282 is urged firmly into engagement with the other cone-shaped recess 279 to prevent rotation of pin 277. Set screw 283 in block 72 has its inner end projecting partially into annular recess 281 in order to prevent lateral displacement of pin 277 within aperture 278. FIG. 16 illustrates schematically the respective alternative positions of pin 73 relative to block 276.

Formed integrally on the rear portion of retaining plate 239 is a rearwardly extending stub 301 which is arranged to cooperate with a thickness control arm 302 which is connected to thickness bearing block 89 and which moves pivotally therewith. Thickness control arm 302 extends forwardly with the end thereof located beneath stub 301. In some embodiments, stub 301 engages arm 302 directly whereby the pivoting downward movement of stub 301, as the bottom of fork 221 moves forwardly, engages the end of arm 302 and moves the latter pivotally thereby causing the incremental counterclockwise pivoting movement of block 89 (FIGS. 3 and 6). This incremental motion takes place during the upward pivoting motion of cantilever arm 51 during which time block 93 has been moved clockwise in the manner described hereinbefore to cause the retraction of cantilever arm 51. At the same time, block 93 has been locked in position after having been retracted by the action of retracting arm 108 as described hereinbefore. Thus, after retracting arm 108 is released with knife bearing 92 having been advanced incrementally by the rotation of lead screw threads 150, bearing seat 96 has been moved forward thereby, so that bearing block 97 is also moved forward for the requisite incremental distance whereby, during the next downward stroke of cantilever arm 51, the specimen will have been advanced the same incremental amount toward the edge of cutting knife 39 for slicing the next section of the specimen.

In some embodiments, where it is desired to adjust the cooperating action between stub 301 and thickness control arm 302, there is provided a roller 303 mounted on the upper end of a pair of links 304 on both sides of arm 302, said links being pivotally mounting on a pin 306 extending through arm 302. As shown in FIGS. 3, 4 and 5, roller 303 is in a position where it establishes the location of the pivoting engagement between stub 301 and arm 302. When roller 303 is in the rearward position, the apparatus operates as a regular microtome. When roller 303 is in the forward position as shown in dotted outline in FIG. 6, the apparatus operates as an ultramicrotome which produces considerably thinner sections of the specimen cut by knife 39. For the same incremental pivoting movement of fork 221, shifting roller 303 from the rearward to the forward location produces, in one embodiment, 1/10th of the pivoting rotation of thickness control arm 302 and of block 89, thereby producing a concomitantly 1/10th advance movement of cantilever arm 51 and of the specimen located at the forward end of said cantilever arm, whereby the apparatus is enabled to cut ultra-thin sections from said specimen. In some embodiments, roller 303 and links 304 may alternatively be mounted on stub 301 for providing the foregoing adjustment means.

OPERATION

After a specimen imbedded in paraffin block 86 or the like has been mounted in specimen holder 84 and properly aligned relative to the cutting edge of knife 39, the tissue sectioning process is effected by rotating hand wheel 52. Although it is not a necessary requirement, it is advantageous to arrange for the cyclical upward and downward pivoting movement of cantilever arm 51 to be coordinated approximately with the general downward and upward movement of handle 53 during the 360° motion of hand wheel 52. During the downward motion of both handle 53 and the downward cutting stroke of arm 51, the pivot bearing seat 96 for cantilever arm knife bearing 98 is maintained in a fixed position so that the specimen passes in a ture, predetermined path across the edge of cutting knife 39. This is accomplished by the action of pawl 126 locking retracting arm 108 so that retracting block 93 is maintained in a rigid, stationary position.

After the specimen has been sectioned, and during the upward movement of cantilever arm 51 and of handle 53, retracting arm 108 is released by the pivoting action of pawl 126 and is urged forward by screw 128 acting upon stud 112 thereby freeing retraction block 93 for the immediate subsequent action of the pivoting movement of the specimen advancing block 89 whereby the apex of knife bearing 92 is moved forward a predetermined increment by the action of stub 301 pivotally bearing upon arm 302 connected to block 89. This is accomplished by actuator lever 81, operative upon abutment block 174, moving timing belt 166 downward to rotate lead screw shaft 149. During the next 180° of rotation of shaft 167, when the rear end of lever 81 moves upwardly, spring 172 in retaining cup 171 returns belt 166 to its base position and lifts abutment block 174 also to a base position in readiness for actuation again during the next cycle of rotation of shaft 67. By the forward incremental pivoting motion that has taken place on the part of block 89, and at the beginning of the downward cutting stroke of arm 51, retraction block 93 is again locked with advancement block 89 so that bearing seat 96 in block 93 has now been advanced for the specified and predetermined incremental distance forward whereby cantilever arm 51 has also been moved into the new cutting location. By the foregoing means, a complete and highly accurate control is obtained for the two important functions of advancing the specimen incrementally with great precision while, at the same time, the fulcrum for the cantilever arm is movable during each cycle in order to provide for the retraction of the specimen out of the path of the cutting knife during the return stroke of cantilever arm 51.

It is understood that when the terms "base" and "frame" are used herein and in the claims, it is contemplated that when components are described as being mounted on such a base or frame, the terms subsume the support walls 54,56 and rear support wall 61, said walls forming a rigid framework upon which the operating parts of the apparatus are mounted.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claims.

I claim:

1. A microtome comprising a base, a stationary cutting knife on said base, a specimen bearing pivotable cantilever arm on said base, said cantilever arm performing successive positive cutting strokes and return strokes for each pivoting cycle of its operation, first means for producing the pivoting action of said arm, a retraction block upon which said arm is pivotally mounted, an advancement block upon which said retraction block is pivotally mounted, a base upon which said advancement block is pivotally mounted, second means connected to said advancement block and operated by said first means to cause the incremental forward movement of the pivot mounting between said retracting block and said advancement block prior to each of said cutting strokes, third means on said retracting block for locking the latter in fixed position during the cutting stroke of said arm to stabilize the pivot locus between said arm and said retracting block, said locking means being operated by said first means to release said retracting block during the return stroke of said arm with the subsequent incremental advancement of the pivot locus between said arm and said retracting block for the next cutting stroke of said arm.

2. A microtome according to claim 1 and further comprising first spring tension means mounted between said cantilever arm and said base for spring loading the pivot system between said cantilever arm and said retraction block, and second spring tension means mounted between said advancement block and said base for spring loading the pivot system between said advancement block and said base.

3. A microtome according to claim 1 and further comprising fourth means connected to said first means for altering the span of the pivoting stroke of said cantilever arm.

4. A microtome according to calim 1 and further comprising fifth means connected to said advancement block for altering its leverage to selectively determine the mode of operation of the apparatus as a microtome or ultramicrotome.

5. A microtome comprising a base, a stationary cutting knife on said base, a specimen bearing cantilever arm, a pivot mounting for said cantilever arm, said cantilever arm performing a positive cutting stroke and a return stroke for each cycle of its operation, first means pivotally movable on said base and operative upon said pivot mounting for incrementally advancing the locus thereof during the return stroke of said cantilever arm, second means pivotally mounted on said first means and supporting the pivot mounting of said cantilever arm, said second means being operable during the return stroke of said arm to retract the locus of said pivot mounting to cause the specimen to bypass the cutting knife, and third means operative on said second means alternately locking said second means relative to said first means during the positive cutting stroke of said arm and releasing said second means during the return stroke of said arm to effect retraction thereof.

6. A microtome according to claim 5 and further comprising drive means, fourth means connecting said drive means to said cantilever arm, fifth means connected between said drive means and said first means for producing the incremental advance of the latter, and sixth means between said drive means and said second means to perform the locking and releasing actions thereof.

7. A microtome according to claim 6 and further comprising means connected between said drive means and said fourth means for selectively changing the span of pivotal motion of said cantilever arm.

8. A microtome according to claim 6 wherein said fifth means comprises a pivot element mounted on said base, a lead screw rotatably mounted on said base, said pivot element engaging the threads of said lead screw and being movable pivotally by the rotation thereof, means for intermittently rotating said lead screw for causing incremental movement of said pivot element, said drive means causing said intermittent rotation of said lead screw during the return stroke of said cantilever arm, said pivot element causing the incremental pivoting action of said first means, and a linkage between said drive means and said third means for producing the alternate locking and releasing action of said third means.

9. A microtome according to claim 8 wherein said intermittent rotating means comprises a one-way clutch on said lead screw, a timing belt engaging said clutch, a pulley engaged by said timing belt, a torsion spring rotationally urging said pulley normally in one direction to cause reverse movement of said timing belt through slippage of said clutch after said belt has been moved in forward drive action, a block mounted fast on said timing belt, and a lever pivotally operated by said drive means, said lever intermittently moving said block and said timing belt in said forward drive action only during the return stroke of said cantilever arm.

10. A microtome according to claim 8 wherein said timing belt is initially adjustable to locate said block in a desired position to be acted upon by said lever whereby the extent of the forward drive action of said timing belt is established.

11. A microtome according to claim 8 and further comprising a rotationally movable control element on said base, means for rotating said control element to a desired location for abutment by said pulley to stop the rotation of the latter under the action of said torsion spring, and adjustment means for locating said element in a predetermined fixed position for establishing the extent of the desired intermittent rotation of said lead screw.

12. A microtome according to claim 11 and further comprising an indicator for visually representing the thickness of tissue section to be cut by said knife, a tension linkage between said pulley and said indicator to accurately coordinate the location of said rotational control element with graduations on said indicator.

13. A microtome according to claim 5 and further comprising a lever element pivotally mounted on said base and which is moved a predetermined distance incrementally during each of said cycles, said lever pivotally engaging said first means to produce a concomitant incremental advancing motion thereof and a movable linkage between said lever element and said first means, said linkage being selectively positionable in either of two positions for altering the ratio of leverage therebetween.

14. A microtome having a pivoting cantilever arm performing repeated cycles of a cutting stroke in one direction and a return stroke in the opposite direction, and comprising a base, an advancement block pivotally mounted on said base at a first fulcrum, a retraction block pivotally mounted on said advancement block at a second fulcrum, said cantilever arm being pivotally mounted on said retraction block at a third fulcrum, means for moving said advancement block pivotally a predetermined forward incremental distance during the return stroke of said arm, means for pivotally moving said retraction block rearwardly for causing the retraction of said third fulcrum during the return stroke of said cantilever arm, and means for subsequently returning said retracting block pivotally in the forward direction into a position where said third fulcrum has been advanced a predetermined distance for the next cutting stroke, and means for maintaining said retracting block in a locked, stable position during the cutting strokes of said arm.

15. A microtome according to claim 14 and further comprising spring means connected between said base and said cantilever arm and said advancement block for impressing a biasing loading on said three fulcrums.

16. A microtome according to claim 14 and further comprising a main drive means, said cantilever arm being connected to and operated by said main drive means, means connected between said advancement block and said main drive means and operated thereby for producing the incremental advance pivoting motion of said advancement block, and means connected between said retraction block and said main drive means and operated thereby for producing the rearward and forward pivoting motion of said retraction block.

17. A microtome according to claim 16 and further comprising a lever connected to said retraction block, a pivotable locking pawl mounted on said base, a cam mounted on said main drive means, a cam follower, and a linkage between said cam and said pawl, said pawl operating upon said lever to lock said retraction block relative to said advancement block during the cutting stroke of said cantilever arm and to release said retraction block and move the latter into a retracting position during the return stroke of said cantilever arm.

18. A microtome according to claim 17 wherein the connections and linkages between the main drive means on the one hand, and the cantilever arm, the retraction block and the advancement block and the locking pawl on the other hand, are coordinated in time relative to one another to ensure a fixed, stable third fulcrum during the cutting stroke of said arm.

19. A microtome according to claim 14 and further comprising an advancement lever pivotally mounted on said base and movable incrementally relative thereto, said lever cooperating with said advancement block to produce the incremental pivoting motion of said block during the return stroke of said cantilever arm, and means for adjusting the engagement between said advancement lever and said advancement block for altering the ratio of the movements of said respective elements relative to each other.

20. A microtome according to claim 19 and further comprising means connected between said drive means and said cantilever arm for adjusting the span of pivotal motion of the latter.

21. A microtome according to claim 14 and further comprising a forwardly extending arm on said advancement block, a rearwardly extending arm on said advancement lever, the lever arm engaging the advancement block arm for causing the incremental pivotal motion of the latter by the incremental pivotal motion of the former.

22. A microtome according to claim 21 and further comprising adjustment means between said arms for establishing different ratios of pivoting motion of said advancement lever relative to said advancement block.

23. A microtome according to claim 22 wherein said adjustment means comprises an element pivotally mounted on either one of said arms, said element being movable into either of two opposite positions where operative engagement between said arms is effected, the position of said adjustment means in either of two positions determining the different desired ratios of the relative pivoting motions of the advancement lever and of the advancement block, respectively.

24. A microtome according to claim 19 and further comprising an incrementally rotatable elongated screw on said base, said screw being engaged by said advancement lever for the incremental pivoting motion of the latter, and spring means between said advancement block and said base normally causing said advancement block engaging said advancement lever to urge the latter to engage said threads by a force longitudinal to the axis of said screw to produce intimate cooperation between said lever and said screw for ensuring accuracy of advancement of said lever and to prevent lost motion.

25. A microtome according to claim 24 and further comprising a one-way clutch on said screw, a pulley spaced from said clutch and mounted on said base, a timing belt connecting said pulley and said clutch, and lever means pivotally mounted on said base, said lever intermittently engaging said timing belt during alternate pivoting strokes to cause the intermittent rotation of said screw.

26. A microtome according to claim 25 and further comprising torsion spring means on said pulley operating to return said timing blet to a predetermined reference position.

27. A microtome according to claim 26 and further comprising means on said frame engaging said pulley to adjust the reference position of said timing belt to predetermine the desired intermittent rotation of said screw and consequently the extent of the movement of said advancement block.

28. A microtome according to claim 24 wherein said engaging means comprises a threaded nut on said advancement lever cooperating with the threads on said advancement screw, spring biased means normally urging said nut laterally against the threads of said screw and means operated by said advancement lever after having reached a predetermined forward motion automatically causing said nut to be disengaged from said lead screw against the action of said nut spring whereby said spring means between said advancement block and said base is operative to cause the return of said advancement lever to a start position relative to said lead screw.

29. A microtome comprising a base, a stationary cutting knife on said base, a specimen-bearing pivotable cantilever arm on said base, said arm performing repeated cycles of a cutting stroke and a return stroke, first means on said base to cause the incremental advancement of said cantilever arm toward said cutting knife prior to the specimen being cut by said knife during each cycle, second means on said base operative in conjunction with said first means and movable into rearward and forward positions for alternately retracting the cantilever arm to cause the specimen to bypass the knife during the return stroke of said arm and restoring the previous position of said arm with the additional increment added by said first means prior to the next succeeding cutting stroke of said cantilever arm, third means connected to said second means and normally urging the latter into the forward position, and fourth means on said base acting alternately to lock said second means in the forward position during the cutting stroke of said cantilever arm and to release and urge said second means into the retracting position against the action of said third means.

30. A microtome according to claim 29 wherein the fulcrum of said cantilever arm relative to said base is moved incrementally forward prior to the specimen being cut by the knife during each cycle of operation of said arm, and is retracted relative to said base during the return stroke of said cantilever arm by the rearward movement of said second means, said cantilever arm fulcrum being advanced for each succeeding cycle to a position relative to said base that is the aggregate distance of the forward movement of said second means plus the additional incremental movement of said first means.

31. A microtome according to claim 29 wherein said first means is pivotally mounted on said base, said second means is pivotally mounted on said first means, said cantilever arm being pivotally mounted on said second means.

32. A microtome according to claim 31 and further comprising biasing means connected between said base on the one hand, and said cantilever arm and said first means on the other hand, for impressing a spring loading upon all three of said pivot mountings.

33. A microtome according to claim 29 and further comprising drive means on said base, said drive means being connected to
   a. said cantilever arm for producing the pivoting motion thereof,
   b. said first means to produce the incremental movement thereof,
   c. said fourth means for producing the alternate locking and retracting operations thereof.

34. A microtome according to claim 33 and further comprising an eccentric link connected between said drive means and said cantilever arm, said link being movable into different positions for changing the span of the pivoting stroke of said cantilever arm.

35. A microtome according to claim 33 and further comprising a lead screw mechanism connected to said first means, and a linkage between said drive means and said lead screw for intermittently rotating the latter to produce an intermittent incremental movement of said first means.

36. A microtome according to claim 33 and further comprising a pivot element connected to said lead screw, said pivot element engaging said first means pivotally, and a linkage mounted between said pivot element and said first means, said linkage being movable into alternate positions for changing the ratio of the respective pivotal motions of said pivot element and said first means.

37. A microtome according to claim 36 and further comprising a rotatable graduated disc, a spring biased connection between said disc and said pivot element whereby the movement of said pivot element causes the corresponding proportionate rotation of said disc, said disc being calibrated to indicate the position of said pivot element relative to said screw.

38. A microtome according to claim 33 and further comprising a one-way slip clutch connected to said lead screw, a timing belt connected to said slip clutch, said timing belt being movable in one direction for intermittently advancing said screw rotatably and alternately returning to a base reference location, and a lever operated by said drive means for intermittently advancing said timing belt during the return stroke of said cantilever arm.

39. A microtome according to claim 38 and further comprisng rotatable indicator means connected to said timing belt, said indicator means being movable jointly with said timing belt to establish a desired base reference location for said timing belt to predetermine the advancement distance of said first means and concomitantly the desired thickness of the section to be cut by the knife from the specimen.

40. A microtome according to claim 33 wherein said fourth means comprises a pivotable pawl movable into alternating opposite positions and further comprising a linkage between said drive means and said pawl for producing the locking and retracting operations thereof.

41. A microtome according to claim 29 wherein said first means comprises a pair of spaced bearing blocks mounted on said base, a pivot element, a knife bearing on said pivot element, spring biasing means mounted on said blocks and connected to said pivot element to urge said knife bearing into pivoting engagement with both of said bearing blocks.

42. A microtome according to claim 41 and further comprising a pair of spaced arms on said pivot element in which said knife bearing is mounted, a plate spanning said arms, a recess in said plate, a pin located and urged into position in said recess by the edge of said knife bearing, and an eyebolt, the loop of said eyebolt encircling said pin and the shaft of said eyebolt being secured to said spring biasing means.

* * * * *